US012673544B2

(12) United States Patent
Kwon

(10) Patent No.: US 12,673,544 B2
(45) Date of Patent: Jul. 7, 2026

(54) ELECTRIFIED VEHICLE

(71) Applicant: TOYOTA JIDOSHA KABUSHIKI KAISHA, Toyota (JP)

(72) Inventor: Hyuksoo Kwon, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 18/581,550

(22) Filed: Feb. 20, 2024

(65) Prior Publication Data

US 2025/0018783 A1     Jan. 16, 2025

(30) Foreign Application Priority Data

Jul. 14, 2023     (JP) ................................. 2023-116334

(51) Int. Cl.
| | |
|---|---|
| *B60K 6/40* | (2007.10) |
| *B60K 1/02* | (2006.01) |
| *B60K 6/26* | (2007.10) |

(52) U.S. Cl.
CPC .................. *B60K 6/40* (2013.01); *B60K 6/26* (2013.01); *B60K 1/02* (2013.01)

(58) Field of Classification Search
CPC ............... B60K 6/40; B60K 6/26; B60K 1/02
See application file for complete search history.

(56) References Cited

U.S. PATENT DOCUMENTS

| | | | | |
|---|---|---|---|---|
| 2015/0306948 | A1* | 10/2015 | Ooki ........................ | B60K 6/48 |
| | | | | 903/902 |
| 2015/0306949 | A1* | 10/2015 | Ooki ........................ | B60K 6/36 |
| | | | | 903/909 |
| 2016/0218602 | A1 | 7/2016 | Fukushima et al. | |
| 2019/0161072 | A1* | 5/2019 | Li ............................ | B60K 6/48 |
| 2019/0222095 | A1* | 7/2019 | Verbridge ............. | F16H 57/033 |
| 2020/0156454 | A1 | 5/2020 | Yaguchi et al. | |
| 2025/0144993 | A1* | 5/2025 | Harris ...................... | B60K 6/40 |

FOREIGN PATENT DOCUMENTS

| | | |
|---|---|---|
| JP | 2012-170177 A | 9/2012 |
| JP | 2016-140198 A | 8/2016 |
| JP | 2020-088939 A | 6/2020 |
| JP | 2022-161647 A | 10/2022 |
| WO | 2012/107826 A1 | 8/2012 |

* cited by examiner

*Primary Examiner* — Forrest M Phillips
(74) *Attorney, Agent, or Firm* — SoraIP, Inc.

(57) ABSTRACT

A case in which a terminal block having a main body to which an electric motor is connected at one end side and a bus bar to which a power control device is connected at the other end side is integrally fixed is installed has an opening that matches the shape of the main body, and a hole into which the main body is fitted is formed. As a result, the terminal block is positioned by fitting the main body into a hole formed in the case and having an opening that matches the shape of the main body of the terminal block. By positioning with the main body integrated with the bus bar, it is possible to reduce the relative positional deviation amount between the bus bar and the electric motor or the power control device. Therefore, it is possible to improve the positioning accuracy of the terminal block.

6 Claims, 5 Drawing Sheets

UPPER   VERTICAL DIRECTION

FORWARD ⟵    ⟶ REAR

FORWARD/BACKWARD DIRECTION

DOWN

UPPER   VERTICAL DIRECTION

FORWARD ⟵⟶ REAR

FORWARD/BACKWARD DIRECTION

DOWN

TERMINAL BLOCK
80

68pt

68p

89

BUS BAR
68

68m

TO SHORTEN
THE BUS BAR

89

82p (MAIN UNIT)
TERMINAL
BLOCK BODY
82

82m

POSITIONING BY TERMINAL
BLOCK BODY SHAPE AND
CASE OPENING SHAPE

18
CASE

88o
OPENING

88
HOLE

ELECTRIFIED VEHICLE

CROSS-REFERENCE TO RELATED APPLICATION

This application claims priority to Japanese Patent Application No. 2023-116334 filed on Jul. 14, 2023, incorporated herein by reference in its entirety.

BACKGROUND

1. Technical Field

The present disclosure relates to an electrified vehicle that includes a terminal block that connects an electric motor and a power control device using a bus bar.

2. Description of Related Art

There is well known an electrified vehicle including: an electric motor; a power control device that controls the electric motor; a terminal block that includes a bus bar to which the electric motor is connected on one end side and the power control device is connected on the other end side and a main body to which the bus bar is integrally fixed; and a case in which the terminal block is installed. Japanese Unexamined Patent Application Publication No. 2012-170177 (JP 2012-170177 A) describes a driving device as an example. JP 2012-170177 A discloses that the terminal block is provided on a fixed base, and that the fixed base is installed so as to cover an opening portion of the case to seal the electric motor in the case.

SUMMARY

In JP 2012-170177 A, the fixed base on which the terminal block is provided is connected to the case via a surface seal. It is difficult to position the fixing base. Therefore, the positioning accuracy of the terminal block may be degraded. The bus bar of the terminal block is connected to the electric motor and the power control device. Therefore, it is desired that the terminal block should be accurately positioned. For example, it is conceivable that positioning is performed by providing positioning pins at both ends of the fixed base and inserting the pins into holes formed in the case. Since the two pins are separate from the fixed base, however, there is a backlash including tolerances, for example, the backlash of the terminal block is increased, and the relative positional deviation amount between the bus bar and the electric motor and the power control device may be increased. There is room for improvement in the positioning accuracy of the terminal block.

The present disclosure has been made in view of the above circumstances. An object of the present disclosure is to provide an electrified vehicle capable of improving the positioning accuracy of a terminal block.

The gist of a first aspect of the present disclosure is as follows.

(a) An electrified vehicle including: an electric motor; a power control device that controls the electric motor; a terminal block that includes a bus bar to which the electric motor is connected on one end side and the power control device is connected on the other end side and a main body to which the bus bar is integrally fixed; and a case in which the terminal block is installed, in which (b) the case is formed with a hole into which the main body is fitted, the hole having an opening portion that matches a shape of the main body.

According to the first aspect of the present disclosure, the terminal block has a main body to which the bus bar is integrally fixed, the electric motor being connected to the bus bar on one end side and the power control device being connected to the bus bar on the other end side. According to the first aspect of the present disclosure, the case in which the terminal block is installed is formed with a hole into which the main body is fitted, the hole having an opening portion that matches the shape of the main body. Consequently, the terminal block is positioned by fitting the main body into the hole formed in the case and having an opening portion that matches the shape of the main body of the terminal block. By positioning the terminal block using the main body integrated with the bus bar, it is possible to reduce the relative positional deviation amount between the bus bar and the electric motor and the power control device as compared with positioning the terminal block using separate pins and holes for inserting the pins, for example. Hence, it is possible to improve the positioning accuracy of the terminal block. In addition, a secondary effect of eliminating the need for separate pins and holes for inserting the pins is also obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram for explaining an example of an electrical configuration related to control of an electric motor and the like;

DETAILED DESCRIPTION OF EMBODIMENTS

Hereinafter, embodiments of the present disclosure will be described in detail with reference to the drawings.

Figure 1:
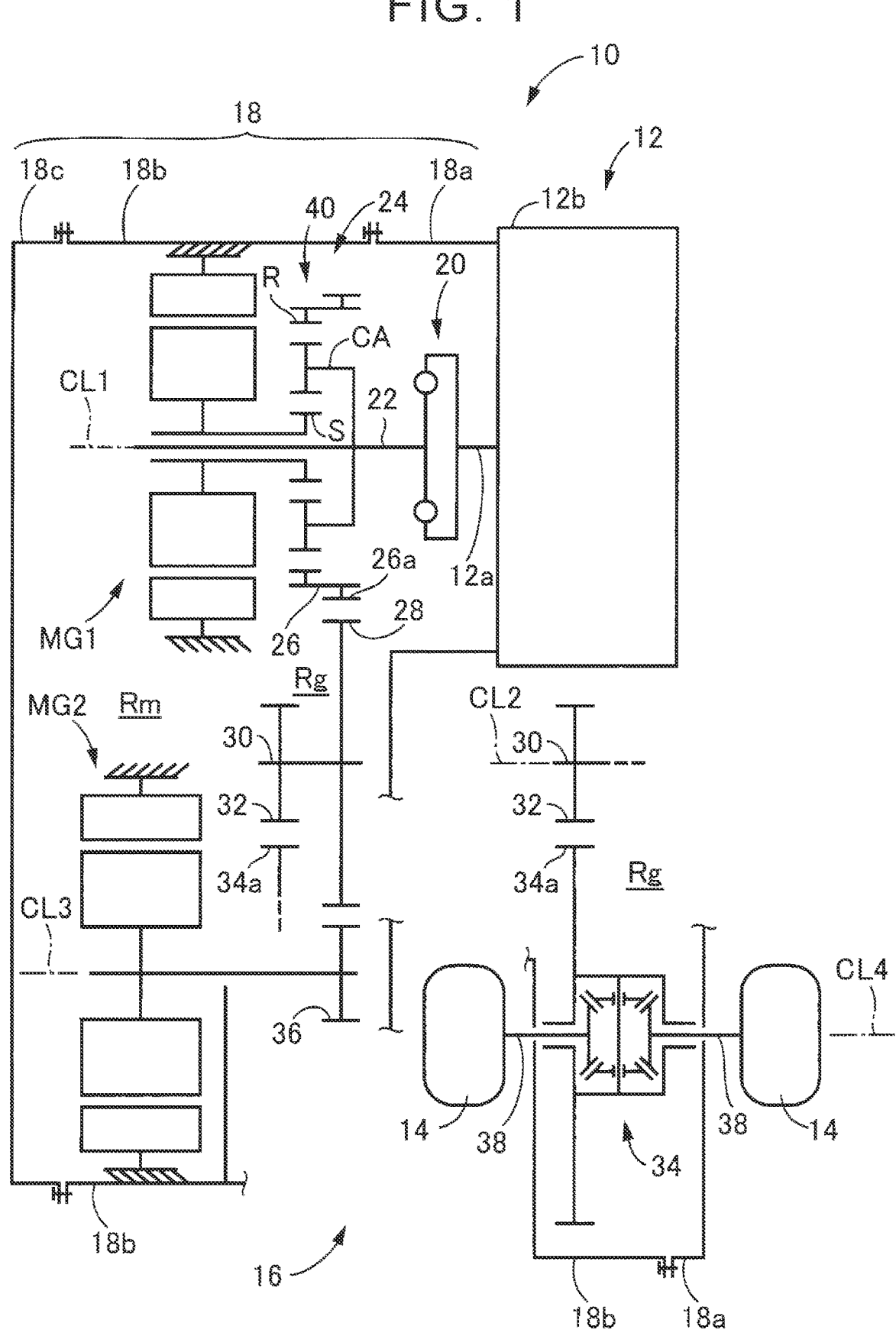
FIG. 1 is a diagram illustrating an exemplary schematic configuration of an electrified vehicle to which the present disclosure is applied.

FIG. 1 is a diagram illustrating an exemplary schematic configuration of an electrified vehicle 10 to which the present disclosure is applied. In FIG. 1, electrified vehicle 10 is a hybrid electric vehicle including an engine 12 functioning as a power source and a second electric motor MG2 serving as an electric motor functioning as a power source. Electrified vehicle 10 also includes drive wheels 14, a power transmission device 16, and a first electric motor MG1.

The engine 12 is a known internal combustion engine. The drive wheels 14 are left and right wheels with respect to the forward and backward directions of electrified vehicle 10. The power transmission device 16 is provided in a power transmission path between the engine 12 and the drive wheels 14 and in a power transmission path between the second electric motor MG2 and the drive wheels 14.

Each of the first electric motor MG1 and the second electric motor MG2 is a known rotary electric machine having a function as an engine for generating mechanical power from electric power and a function as a generator for generating electric power from mechanical power. The first electric motor MG1 and the second electric motor MG2 are so-called motor generators. The first electric motor MG1 and the second electric motor MG2 are provided in a non-rotatable case 18 which is a non-rotatable member attached to the vehicle body. In this embodiment, the first electric motor MG1 and the second electric motor MG2 are referred to as motor MG when the first electric motor MG1 and the second electric motor MG2 are not particularly distinguished from each other.

The power transmission device 16 includes, in the case 18, a damper 20, an input shaft 22, a transmission unit 24, a composite gear 26, a driven gear 28, a driven shaft 30, a final gear 32, a differential gear 34, a reduction gear 36, and the like. The power transmission device 16 includes a pair of drive shafts 38 and the like connected to the differential gear 34.

The damper 20 is connected to the crankshaft 12a of the engine 12. The input shaft 22 functions as an input rotation member of the transmission unit 24. The input shaft 22 is connected to the damper 20. The input shaft 22 is connected to the crankshaft 12a via a damper 20 or the like. The transmission unit 24 is connected to the input shaft 22. The composite gear 26 is a rotating body on the output side of the transmission unit 24. In the composite gear 26, a drive gear 26a is formed on a part of the outer peripheral surface. The drive gear 26a is an output-rotating member of the transmission unit 24. The driven gear 28 meshes with the drive gear 26a. The driven shaft 30 fixes the driven gear 28 and the final gear 32 so as not to be relatively rotatable. The final gear 32 has a smaller diameter than the driven gear 28. The final gear 32 is meshed with the differential ring gear 34a. The reduction gear 36 has a smaller diameter than the driven gear 28. The reduction gear 36 meshes with the driven gear 28. A rotor shaft of the second electric motor MG2 is connected to the reduction gear 36. A second electric motor MG2 is connected to the reduction gear 36 so as to be capable of transmitting power.

The power transmission device 16 configured as described above is suitably used for vehicles of FF (front engine/front drive) type or RR (rear engine/rear drive) type. The power transmission device 16 transmits the power output from the engine 12 to the driven gear 28 via the transmission unit 24. Further, the power transmission device 16 transmits the power outputted from the second electric motor MG2 to the driven gear 28 via the reduction gear 36. The power transmission device 16 transmits the power transmitted to the driven gear 28 to the drive wheels 14 through the driven shaft 30, the final gear 32, the differential gear 34, the drive shaft 38, and the like in order. The driven gear 28, the driven shaft 30, and the final gear 32 are transmission mechanisms that transmit power from the second electric motor MG2 to the differential gear 34. The driven gear 28, the driven shaft 30, and the final gear 32 are transmission mechanisms that transmit power from the drive gear 26a to the differential gear 34. The differential gear 34 distributes power from the engine 12 and the second electric motor MG2 to the drive wheels 14. The drive shaft 38 transmits power from the differential gear 34 to the drive wheels 14. The second electric motor MG2 is connected to the drive wheels 14 so as to be capable of transmitting power.

The transmission unit 24 includes a first electric motor MG1 and a differential mechanism 40. The differential mechanism 40 is a known single pinion type planetary gear set including a sun gear S, a carrier CA, and a ring gear R. The sun gear S is connected to the rotor shaft of the first electric motor MG1. That is, the differential mechanism 40, which is a part of the power transmission device 16, is connected such that a first electric motor MG1 as an electric motor can transmit power. The carrier CA is connected to the input shaft 22. That is, in the differential mechanism 40, the engine 12 is connected via the input shaft 22 or the like so as to be capable of transmitting power. The ring gear R is formed on a part of the inner circumferential surface of the composite gear 26. The ring gear R is integrally connected to the drive gear 26a. That is, the differential mechanism 40 is connected to the drive wheels 14 so as to be capable of transmitting power.

The differential mechanism 40 functions as a differential mechanism that generates a differential operation in which the engine 12 is connected to be capable of transmitting power. The differential mechanism 40 is a power split mechanism that mechanically divides the power of the engine 12 inputted to the carrier CA into a first electric motor MG1 and a drive gear 26a. The transmission unit 24 is a known electric transmission mechanism in which the differential state of the differential mechanism 40 is controlled by controlling the operating state of the first electric motor MG1.

The power transmission device 16 has a first axis CL1, a second axis CL2, a third axis CL3, and a fourth axis CL4. These four axial CL1, CL2, CL3, CL4 are parallel to each other. The first axis CL1 is an axis center of the rotor shaft of the input shaft 22 or the first electric motor MG1. That is, the first axis CL1 is the rotational axis of the first electric motor MG1. The transmission unit 24 and the first electric motor MG1 are disposed around the first axis CL1. The second axis CL2 is an axis center of the driven shaft 30. The driven gear 28 and the final gear 32 are disposed around the second axis CL2. That is, the second axis CL2 is the rotational axis of the driven gear 28, the driven shaft 30, and the final gear 32. The third axis CL3 is the axis of the rotor shaft of the second electric motor MG2. That is, the third axis CL3 is the rotational axis of the second electric motor MG2. The second electric motor MG2 and the reduction gear 36 are disposed around the third axis CL3. The fourth axis CL4 is an axis of the drive shaft 38 and an axis of the differential gear 34. That is, the fourth axis CL4 is the rotational axis of the drive shaft 38 and the differential gear 34. The differential gear 34 is disposed around the fourth axis CL4. The second axis CL2 and the fourth axis CL4 are rotational axes of the power transmission device 16.

The case 18 includes a housing 18a, a case main body 18b, and a cover 18c. In the housing 18a, an engine block 12b of the engine 12 is connected to an opened part of the engine 12. The housing 18a and the case main body 18b are integrally connected by fasteners such as bolts so that an opened portion of the housing 18a facing away from the engine 12 and an opened portion of the case main body 18b facing toward the engine 12 are aligned. The case main body 18b and the cover 18c are integrally connected by fasteners so as to close an open part of the case main body 18b opposite to the engine 12 with a cover 18c. The case main body 18b is a case including a partition wall (not shown) that partitions a gear chamber Rg that houses the transmission unit 24, the driven gear 28, the differential gear 34, and the like, and a motor chamber Rm that houses the electric motor MG. The case main body 18b forms a gear-chamber Rg with the housing 18a. The case main body 18b forms a motor chamber Rm with the cover 18c. As described above, the case 18 houses the electric motor MG and the power transmission device 16 excluding the drive shaft 38 and the like.

Figure 2:
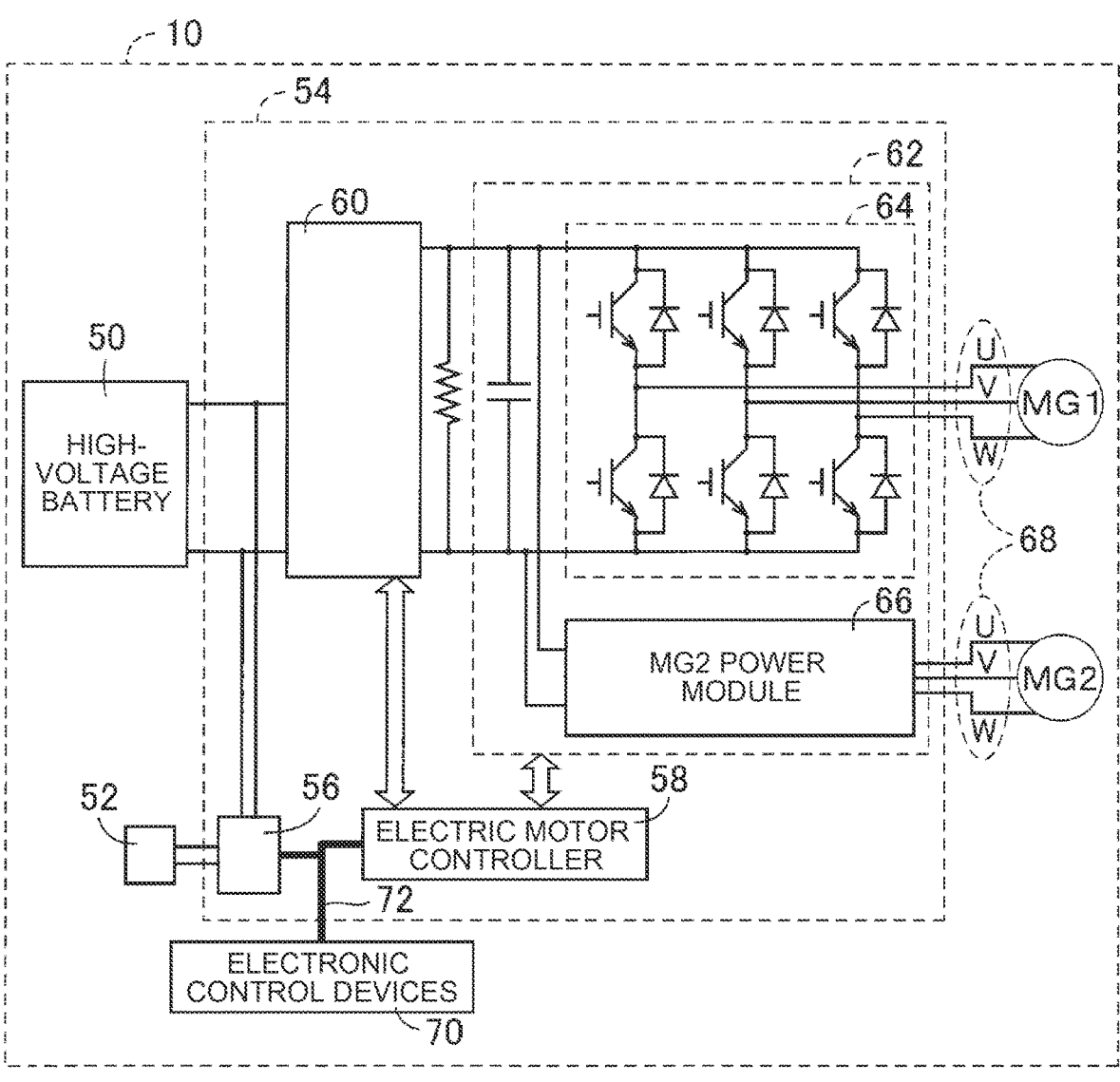

FIG. 2 is a diagram illustrating an exemplary electric configuration related to control of an electric motor MG and the like. In FIG. 2, electrified vehicle 10 further includes a high voltage battery 50, an auxiliary battery 52, a power control unit 54, and the like.

The high-voltage battery 50 is a DC power supply that can be charged and discharged. The high-voltage battery 50 is, for example, a secondary battery such as a nickel-hydrogen secondary battery or a lithium-ion battery. The high voltage battery 50 is connected to the power control unit 54. The stored electric power is supplied from the high-voltage battery 50 to, for example, the second electric motor MG2 via the power control unit 54. The high-voltage battery 50 is supplied with electric power by the power generation control of the first electric motor MG1 and electric power by the regenerative control of the second electric motor MG2 via the power control unit 54. The high-voltage battery 50 is a battery for driving.

The power control unit 54 includes a DC-DC converter 56, an electric motor control device 58, a step-up converter 60, an inverter 62, and the like. The power control unit 54 is a power control device that controls electric power exchanged between the high-voltage battery 50 and the electric motor MG. That is, the power control unit 54 is a power control device that controls the electric motor MG.

DC-DC converters 56 are connected to the high voltage battery 50. DC-DC converter 56 functions as a charging device that reduces the voltage of the high-voltage battery 50 to a voltage equivalent to that of the auxiliary battery 52 and charges the auxiliary battery 52. The auxiliary battery 52 supplies electric power for operating an auxiliary machine, an electric motor control device 58, an electronic control device 70 to be described later, and the like provided in electrified vehicle 10.

The step-up converter 60 includes a reactor, a switching element, and the like (not shown). The step-up/step-down converter 60 is a step-up/step-down circuit having a function of boosting the voltage of the high-voltage battery 50 and supplying the voltage to the inverter 62, and a function of stepping down the voltage converted into a direct current by the inverter 62 and supplying the stepped-down voltage to the high-voltage battery 50.

The inverter 62 includes a MG1 power module 64, a MG2 power module 66, and the like. Each of MG1 power module 64 and MG2 power module 66 includes a plurality of transistors and the like that convert a direct current into an alternating current by being turned on and off as switching elements. Electrified vehicle 10 further comprises a bus bar 68 to which the electric motor MG is connected at one end side and the power control unit 54 is connected at the other end side. The bus bars 68 are power lines that electrically connect the electric motor MG and the inverters 62. The bus bar 68 includes a plurality of bus bars.

The inverter 62 converts the direct current from the step-up converter 60 into an alternating current for driving the electric motor MG. The inverter 62 converts an alternating current generated by the first electric motor MG1 by the power of the engine 12 into a direct current. Also, once 62 converts the alternating current generated by the second electric motor MG2 by the regenerative braking into a direct current. The inverter 62 supplies the alternating current generated by the first electric motor MG1 as the driving power of the second electric motor MG2 in accordance with the traveling condition.

Electrified vehicle 10 further includes an electronic control device 70, a communication line 72, and the like. The electronic control device 70 transmits and receives signals to and from DC-DC converters 56, the electric motor control device 58, and the like via the communication lines 72. The electronic control device 70 performs various types of control of electrified vehicle 10 based on, for example, a signal from a sensor (not shown) or the like. The communication line 72 is, for example, a known Controller Area Network (CAN) communication line. The electric motor control device 58 controls the step-up converters 60 and the inverters 62 based on commands from the electronic control device 70 to control the electric motor MG.

Figure 3:
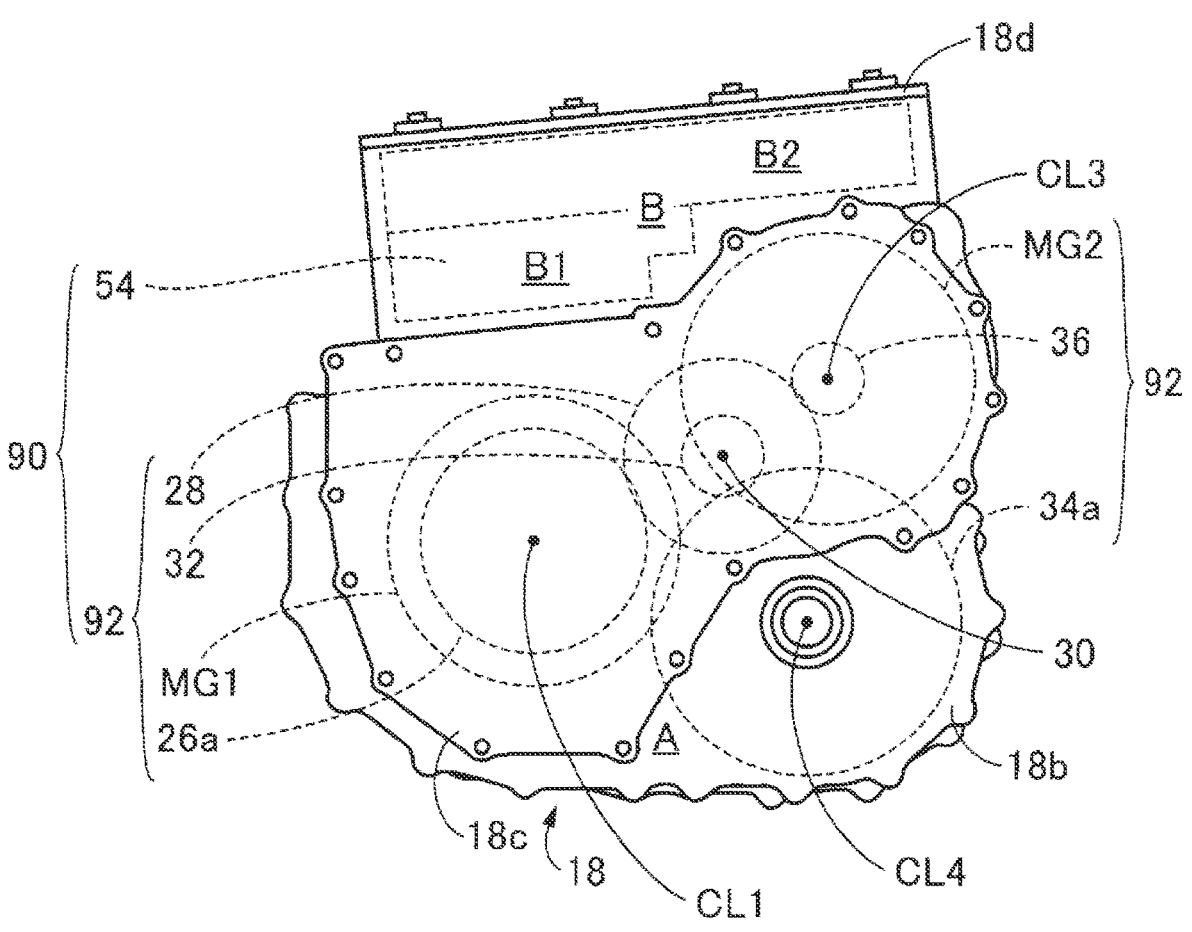
FIG. 3 is a diagram illustrating an example of a schematic configuration of an electromechanical integrated unit.
Figure 3:
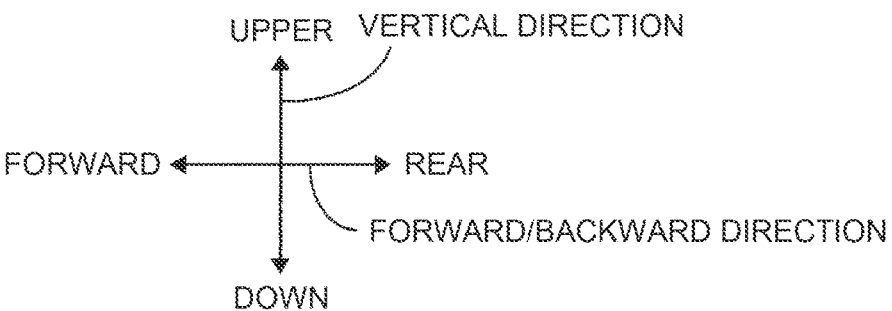

FIG. 3 is a diagram illustrating an example of a schematic configuration of the drive unit 90. FIG. 3 is a side view from the left side of electrified vehicle 10. In FIG. 3, the transaxle 92 and the power control unit 54 are housed in the same case 18 as the drive unit 90. The drive unit 90 is a unit in which the transaxle 92 and the power control unit 54 are integrated, that is, an electromechanical integrated unit. The transaxle 92 is a drive including a power transmission device 16 (26a, 28, 32, 34a, 36, and the like), and an electric motor MG. In the drawings, the vertical direction and the forward-backward direction indicate the direction in electrified vehicle 10 in the mounted condition. The vehicle-width direction is a horizontal direction perpendicular to the forward-backward direction of electrified vehicle 10. The vehicle-width direction is a direction parallel to the axial direction of each of the first axis CL1, the second axis CL2, the third axis CL3, and the fourth axis CL4.

The case 18 further includes a protective plate 18d in addition to the housing 18a, the case main body 18b, and the cover 18c described above. The case main body 18b has a bottom wall and side walls extending vertically upward from the outer peripheral edge of the bottom wall on the front side and the rear side in the forward-reverse direction, respectively. The vertical top is open. The protective plate 18d is a plate-shaped member that closes an opening in a vertical upper portion of the case main body 18b. The case main body 18b has a partition wall (not shown) inside. By the partition wall, the inside is partitioned into two spaces: a lower space A which is a space in a vertical lower direction and an upper space B which is an upper space in a vertical direction.

The transaxle 92 is accommodated in the lower space A and the housing 18a in the case main body 18b in the mounted condition in electrified vehicle 10.

The power control unit 54 is accommodated in the upper space B of the case main body 18b in the mounted condition in electrified vehicle 10. The upper space B includes the surplus space B1 generated by the arrangement of the electric motor MG and the uppermost space B2 at the vertical upper part of the second electric motor MG2. The length of the surplus space B1 is shorter than the length of the uppermost space B2 in the forward-backward direction. The power control unit 54 is disposed vertically above and adjacently to the electric motor MG in the mounted condition in electrified vehicle 10.

In the power control unit 54, for example, DC-DC converter 56 and a reactor (not shown) included in the step-up converter 60 are accommodated in the surplus space B1 in view of the fact that the components are relatively short-length components and relatively easy-to-replace components.

See FIG. 3. The transaxle 92 is disposed such that, in the mounted condition in electrified vehicle 10, the first axis CL1, the second axis CL2, the third axis CL3, and the fourth axis CL4 are parallel to the horizontal direction perpendicular to the forward/reverse direction of electrified vehicle 10. In addition, the transaxle 92 is mounted on electrified vehicle 10 in such a manner that the positions of the first axis CL1, the second axis CL2, the third axis CL3, and the fourth axis CL4 are in the order of the second electric motor MG2, the driven shaft 30, the first electric motor MG1, and the differential gear 34 downward from the upper side in the vertical direction, and in the order of the first electric motor MG1, the driven shaft 30, the differential gear 34, and the second electric motor MG2 rearward from the front side in the forward/reverse direction. Focusing on the first electric motor MG1 and the second electric motor MG2, the transaxle 92 is disposed in the order of the third axis CL3 and the first axis CL1 from the vertical upper side to the lower side in the mounted condition in electrified vehicle 10. As a result, the vertical size of the transaxle 92 is reduced while the distance between the axes of the first axis CL1, the second axis CL2, the third axis CL3, and the fourth axis CL4 is appropriately secured. Thus, the arrangement of the first electric motor MG1 and the second electric motor MG2 creates a surplus space B1. Then, the uppermost space B2 is generated at the vertical upper portion of the second electric motor MG2. The power control unit 54 is mounted in the upper space B (B1+B2).

The power control unit 54 is disposed vertically above the transaxle 92 in the mounted condition in electrified vehicle 10. In addition, the power control unit 54 is arranged at a position where the lower vertical part of the power control unit 54 overlaps the transaxle 92 in the horizontal direction, in particular in the forward-backward direction, in the mounted condition in electrified vehicle 10. In particular, the lower vertical portion of the power control unit 54 is disposed at a position that overlaps the upper vertical portion of the second electric motor MG2 in the horizontal direction, particularly in the forward-backward direction. Further, in the power control unit 54, in the mounted condition in electrified vehicle 10, a lower part of the power control unit 54 in the vertical direction is disposed above the first electric motor MG1 in the vertical direction. The vertically lower part of the power control unit 54 is, for example, a component (e.g., a DC-DC converter 56, a reactor) accommodated in the surplus space B1 of the power control unit 54.

A power control unit 54 is mounted in the space created by the reduced vertical size of the transaxle 92. Then, a space is created above the drive unit 90 in the vertical direction.

Figure 4:
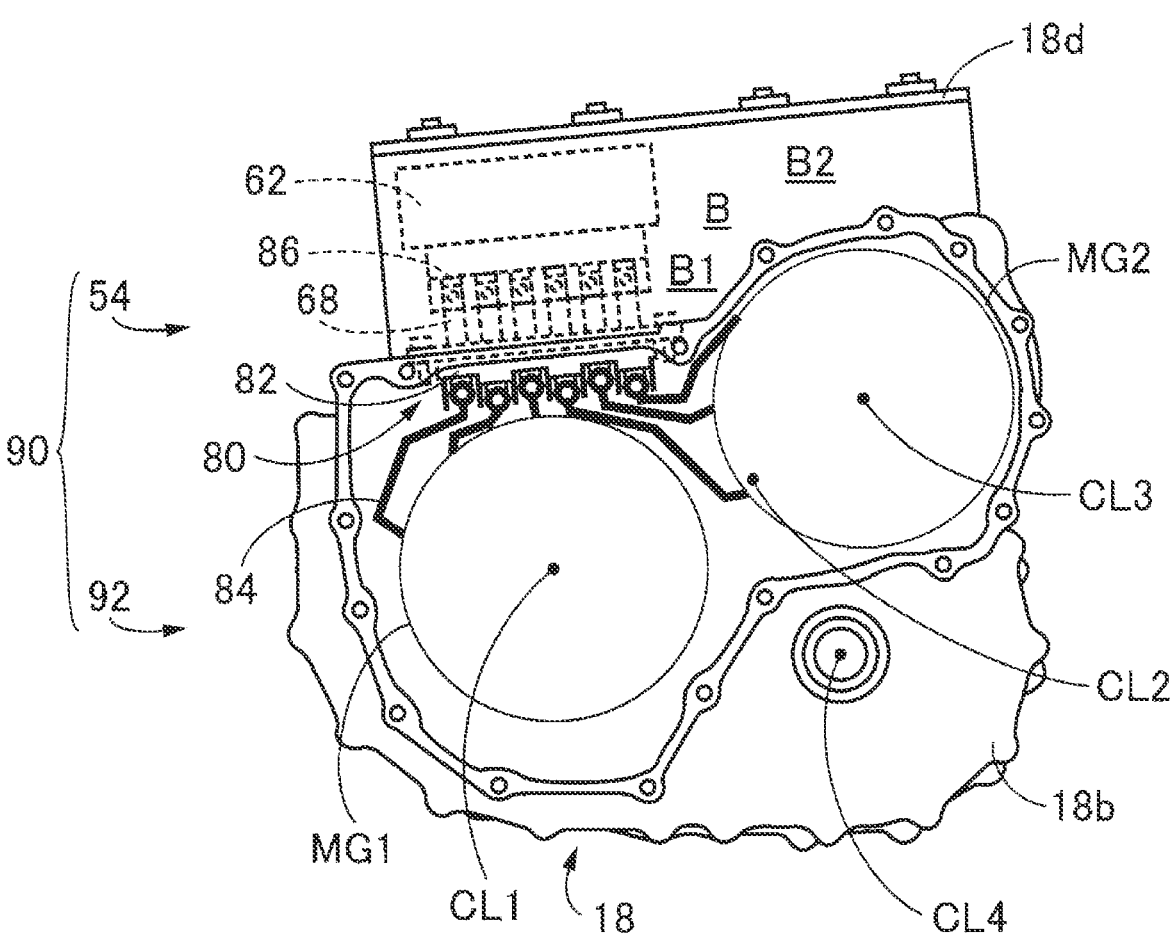
FIG. 4 is a diagram illustrating an exemplary configuration in which a terminal block is installed.
Figure 4:
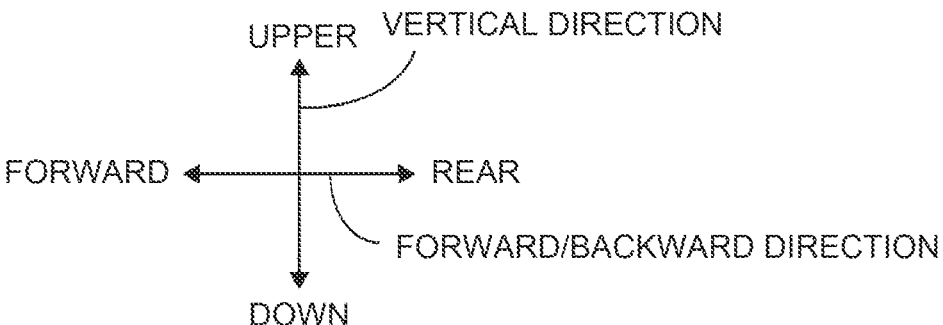
Figure 5:
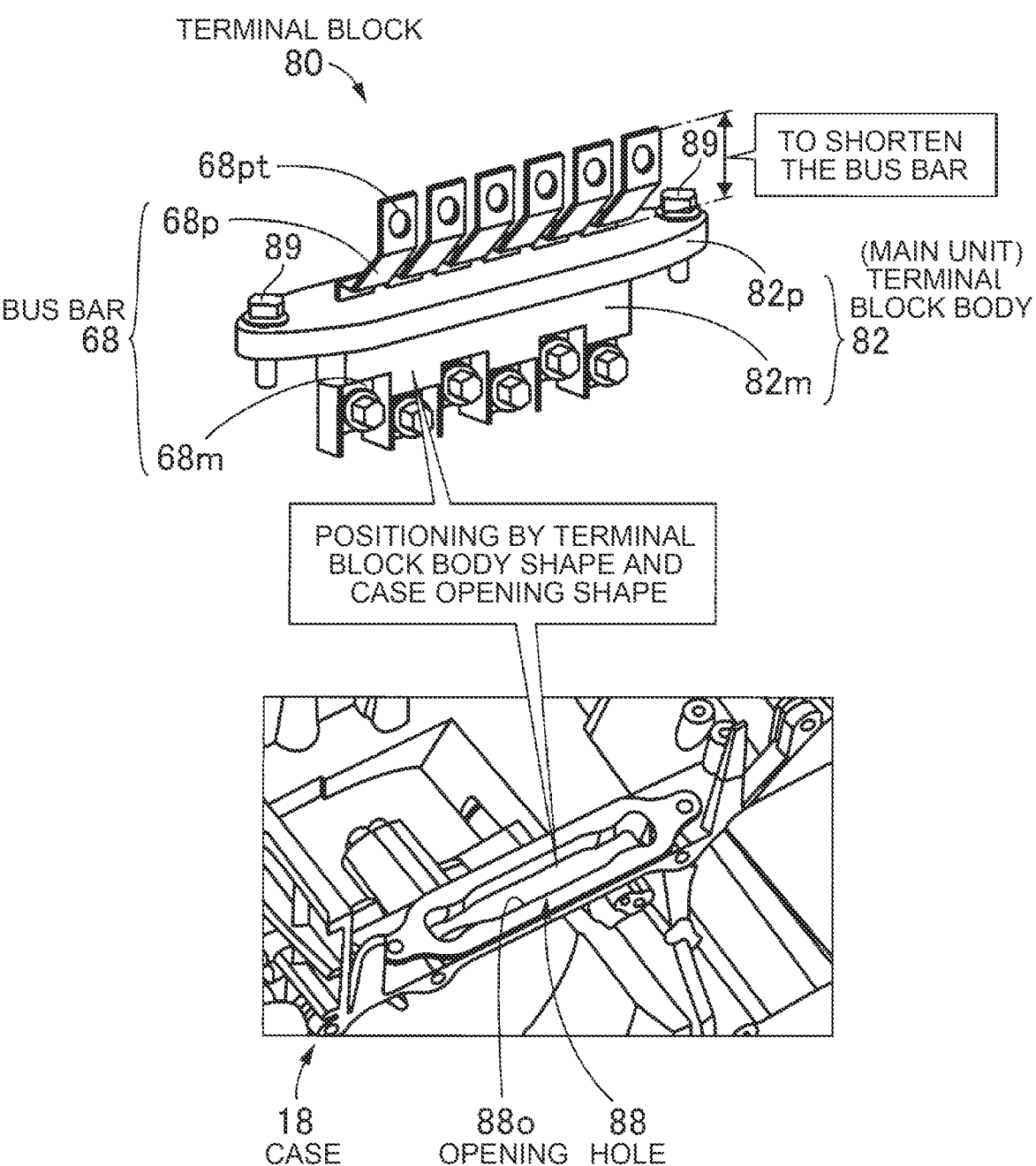
FIG. 5 is a diagram for explaining an example of the configuration of terminal block and an example of the positioning of the terminal block.

Here, in electrified vehicle 10, as shown in FIGS. 4 and 5, the terminal block 80 to which the bus bar 68 is fixed is installed in the case 18. Installation of the terminal block 80 will be described in detail below. As described above, the bus bar 68 includes a plurality of bus bars. However, for convenience, a single bus bar is labeled 68. Installation of the terminal block 80 will be described.

FIG. 4 is a diagram illustrating an example of a state in which the terminal block 80 is installed. FIG. 5 is a diagram for explaining an example of the shape of the terminal block 80 and an example of the positioning of the terminal block 80.

In FIGS. 4 and 5, the terminal block 80 includes a bus bar 68 and a terminal block main body 82. The terminal block main body 82 is a main body of the terminal block 80 to which the bus bar 68 is integrally fixed. The terminal block 80 is installed in electrified vehicle 10 in the forward/backward direction of electrified vehicle 10 with respect to the second electric motor MG2, and is installed above the first electric motor MG1 in the vertical direction.

Bus bar 68 has a MG terminal portion 68m protruding to one end side, i.e., the electric motor MG side with respect to the terminal block main body 82, and a PCU terminal portion 68p protruding to the other end side, i.e., the power control unit 54 side with respect to the terminal block main body 82.

MG terminal portion 68m is connected to MG bus bar 84 extending from the electric motor MG. MG bus bar 84 is a power line that electrically connects the electric motor MG and the bus bar 68. MG bus bars 84 are electric motor-side bus bars.

PCU terminal 68p is connected to a PCU bus bar 86 extending from the power control unit 54, in particular the inverter 62. PCU terminal portion 68p has a longitudinal shape extending from the terminal block main body 82 toward the power control unit 54 side, and is a portion to which the power control unit 54 is connected at the distal end portion 68pt on the power control unit 54 side. PCU terminal portion 68p extends vertically upward from the terminal block main body 82 in the mounted condition in electrified vehicle 10. The distal end portion 68pt of the PCU terminal portion 68p is connected to a PCU bus bar 86 that extends vertically downward from the vertical upper part of the power control unit 54, for example, the inverter 62, in the mounted condition in electrified vehicle 10. PCU bus bars 86 are power lines that electrically connect the inverters 62 and the bus bars 68. PCU bus bar 86 is a power control device-side bus bar.

As a positioning method for installing the terminal block 80, for example, a positioning pin is provided at both ends of the terminal block main body 82, and the pin is inserted into a hole formed in the case 18. However, the two pins are separate from the terminal block main body 82. Therefore, there is a positional deviation of each. The backlash of the terminal block 80 is increased. Then, the positioning accuracy is not good. If the positioning accuracy of the terminal block 80 is poor, for example, there is a possibility that the positional deviation between the distal end portion 68pt of the PCU terminal portion 68p and the PCU bus bar 86 is increased. When a relatively large positional deviation amount is obtained at the time of connection between the distal end portion 68pt and PCU bus bar 86 by bolting, the displacement amount of PCU terminal portion 68p and/or PCU bus bar 86 increases. Then, the stress generated at that time is increased. If the stresses are increased, the durability of the bus bars 68 and/or PCU bus bars 86 may be reduced. On the other hand, it is conceivable to extend the longitudinal length of PCU terminal portion 68p as a way of reducing the stresses even when the displacement is large.

On the other hand, in the drive unit 90, the power control unit 54 is disposed vertically above the transaxle 92. In view of reducing the vertical physique of the drive unit 90, the physical distance between the transaxle 92 and the power control unit 54 needs to be reduced. However, as a countermeasure against the poor positioning accuracy of the terminal block 80, when the longitudinal length of PCU terminal portion 68p is extended, a dead space is generated. This makes it difficult to shorten the physical distance between the transaxle 92 and the power control unit 54. It is desired to improve the positioning accuracy of the terminal block 80.

Therefore, in this embodiment, in order to improve positioning accuracy of the terminal block 80, the positioning of the terminal block 80 and the case 18 is performed in the terminal block main body 82 integrated with the bus bar 68. For example, as shown in FIG. 5, a hole 88 into which the terminal block main body 82 is fitted is formed in the case 18. Particularly on the case main body 18*b*, a hole 88 into which the terminal block main body 82 is fitted is formed. The hole 88 has an opening 88*o* that matches the configuration of the terminal block main body 82.

The terminal block main body 82 includes a MG main body 82*m* on one end side, that is, the electric motor MG side, and a PCU main body 82*p* on the other end side, that is, the power control unit 54 side. The outer peripheral shape of MG main body 82*m* matches the shape of the opening 88*o* to such an extent that MG main body 82*m* is fitted into the opening 88*o* without any backlash. With MG body 82*m* fully fitted into the hole 88, PCU body 82*p* is contacted with the case main body 18*b*. The terminal block 80 is fixed to the case main body 18*b* by attaching PCU main body 82*p* to the case main body 18*b* with a bolt 89 or the like.

As described above, according to the present embodiment, the case 18 has a hole 88 into which the terminal block main body 82 is fitted, which has an opening 88*o* that matches the configuration of the terminal block main body 82. Accordingly, the terminal block 80 is positioned by fitting the terminal block main body 82 into the hole 88. By positioning the terminal block main body 82 integrated with the bus bar 68, for example, as compared with positioning by a hole for inserting a pin and a separate pin, it is possible to reduce the relative positional deviation between the bus bar 68 and MG bus bar 84 and PCU bus bar 86. Therefore, the positioning accuracy of the terminal block 80 can be improved. In addition, a secondary effect of eliminating the need for a separate pin and a hole for inserting the pin and improving the space is also obtained.

Further, according to the present embodiment, the bus bar 68 has a longitudinal shape extending from the terminal block main body 82 toward the power control unit 54 side, and has an PCU terminal portion 68*p* to which the power control unit 54 is connected at the distal end portion 68*pt* of the power control unit 54 side. By improving the positioning accuracy of the terminal block 80, stresses generated when the distal end portion 68*pt* is connected to PCU bus bar 86 are suppressed. Therefore, the longitudinal length of PCU terminal portion 68*p* can be shortened (see FIG. 5). That is, the bus bar 68 can be shortened.

Further, according to the present embodiment, PCU terminal portion 68*p* extends vertically upward from the terminal block main body 82 in the mounted condition in electrified vehicle 10. By shortening the length of PCU terminal portion 68*p* in the longitudinal direction, it is possible to reduce the size in the vertical direction of the drive unit 90 in which the power control unit 54 is disposed vertically above the transaxle 92 in the mounted condition in electrified vehicle 10. That is, it is possible to reduce the height of the drive unit 90. Then, the mounting space of the drive unit 90 can be reduced.

Further, according to the present embodiment, the terminal block 80 is installed in electrified vehicle 10 in the forward-reverse direction with respect to the second electric motor MG2 and is installed above the first electric motor MG1 in the vertical direction in the mounted condition in electrified vehicle 10. The terminal block 80 is installed in a space created by the arrangement of the first electric motor MG1 and the second electric motor MG2. Therefore, it is possible to appropriately reduce the height of the drive unit 90.

Further, according to the present embodiment, the distal end portion 68*pt* of the PCU terminal portion 68*p* is connected to the PCU bus bar 86 extending vertically downward from the upper part in the vertical direction of the power control unit 54 in the mounted condition in electrified vehicle 10. By improving the positioning accuracy of the terminal block 80, it is possible to appropriately shorten the longitudinal length of PCU terminal portion 68*p*. In addition, it is possible to appropriately reduce the height of the drive unit 90.

Embodiments of the present disclosure have been described in detail with reference to the drawings. However, the disclosure also applies in other embodiments.

For example, in the above-described embodiment, the transaxle 92 may be mounted on electrified vehicle 10 such that the positions of the first axis CL1, the second axis CL2, the third axis CL3, and the fourth axis CL4 are in the order of the first electric motor MG1, the driven shaft 30, the differential gear 34, and the second electric motor MG2 from the rear to the front in the forward/backward direction. The transaxle 92 and the power control unit 54 may be housed in separate cases. Further, the power control unit 54 may not necessarily be disposed on the vertical upper portion of the transaxle 92. Further, the transaxle 92 and the power control unit 54 are accommodated in a space partitioned by a partition wall in the case 18. However, the transaxle 92 and the power control unit 54 may be accommodated in the same space without a partition wall.

Further, in the above-described embodiment, electrified vehicle may be a battery electric vehicle provided with an electric motor for driving. This battery electric vehicle is mainly different from electrified vehicle 10 of the above-described embodiment in that, for example, the components around the first axis CL1 are not provided. The components around the first axis CL1 are a transmission unit 24 including an engine 12 and a first electric motor MG1. In this battery electric vehicle, for example, at the arrangement positions of the components of the transaxle 92 shown in FIG. 3, the first electric motor MG1 is deleted, and the second electric motor MG2 functions as battery electric vehicle electric motor. Alternatively, electrified vehicle may be a series-type hybrid electric vehicle including an engine, an electric motor for driving functioning as a power source, and an electric motor for supplying electric power that is connected to the engine so as to be able to transmit power and generates electric power by the power of the engine. In such a series-type hybrid electric vehicle, the power transmission path between the engine and the drive wheels may be interrupted or connected by the operation of the clutch. Alternatively, electrified vehicle may be a parallel hybrid electric vehicle including an engine, a power transmission device that transmits power from the engine to the drive wheels, and an electric motor that transmits power to the drive wheels via the power transmission device.

It should be noted that the above description is merely one embodiment. The present disclosure can be implemented in various modifications and improvements based on the knowledge of those skilled in the art.

What is claimed is:

1. An electrified vehicle comprising:
   an electric motor;
   a power control device configured to control the electric motor;
   a terminal block that includes
      a bus bar to which the electric motor is connected on a first end and the power control device is connected on a second end and
      a main body to which the bus bar is integrally fixed; and
   a case in which the terminal block is installed, wherein
   the case includes an opening portion,
   a shape of the opening portion matches an outer peripheral shape of the main body, and the terminal block is configured to be fitted into the opening portion such that an inner peripheral surface of the opening portion contacts an outer peripheral surface of the main body.

2. The electrified vehicle according to claim 1, wherein the terminal block includes a plurality of the bas bars, and the bus bars are arranged parallel to each other.

3. The electrified vehicle according to claim 1, wherein the bus bar includes a longitudinally shaped portion which extends from the main body toward the second end and to which the power control device is connected at a distal end portion on the second end.

4. The electrified vehicle according to claim 3, further comprising a power transmission device to which the electric motor is coupled to transmit power, wherein:

the case houses, as an electromechanical integration unit, a drive device and the power control device, the drive device including the electric motor and the power transmission device;

the power control device is disposed adjacently above the electric motor in a vertical direction when mounted on the electrified vehicle; and the longitudinally shaped portion of the bus bar extends upward from the main body in the vertical direction when mounted on the electrified vehicle.

5. The electrified vehicle according to claim 4, wherein:

the electric motor includes a first electric motor and a second electric motor;

the drive device is arranged such that, when mounted on the electrified vehicle, a rotational axis of the first electric motor, a rotational axis of the second electric motor, and a rotational axis of the power transmission device are each parallel to a horizontal direction perpendicular to a longitudinal direction of the electrified vehicle, and the rotational axis of the second electric motor is located above the rotational axis of the first electric motor in the vertical direction;

the power control device is arranged such that, when mounted on the electrified vehicle, a lower portion of the power control device overlaps an upper portion of the second electric motor when viewed in the longitudinal direction, and the lower portion of the power control device is located above the first electric motor in the vertical direction; and the terminal block is installed in the longitudinal direction with respect to the second electric motor, and installed above the first electric motor in the vertical direction, when mounted on the electrified vehicle.

6. The electrified vehicle according to claim 5, wherein the distal end portion of the bus bar on the second end is connected to a power control device side bus bar that extends downward in the vertical direction from an upper portion of the power control device in the vertical direction when mounted on the electrified vehicle.

* * * * *